United States Patent
Tanizawa et al.

(10) Patent No.: US 10,439,807 B2
(45) Date of Patent: Oct. 8, 2019

(54) COMMUNICATION DEVICE, COMMUNICATION SYSTEM, AND COMMUNICATION METHOD

(71) Applicant: Kabushiki Kaisha Toshiba, Minato-ku (JP)

(72) Inventors: Yoshimichi Tanizawa, Yokohama (JP); Ririka Takahashi, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 260 days.

(21) Appl. No.: 15/433,504

(22) Filed: Feb. 15, 2017

(65) Prior Publication Data

US 2018/0054306 A1    Feb. 22, 2018

(30) Foreign Application Priority Data

Aug. 18, 2016  (JP) ................................. 2016-160603

(51) Int. Cl.
*H04L 9/08* (2006.01)
*H04L 29/06* (2006.01)

(52) U.S. Cl.
CPC .......... *H04L 9/0858* (2013.01); *H04L 9/0819* (2013.01); *H04L 63/061* (2013.01); *H04L 63/068* (2013.01)

(58) Field of Classification Search
CPC ... H04L 9/08; H04L 9/14; H04L 63/06; H04L 63/0442
See application file for complete search history.

(56) References Cited

U.S. PATENT DOCUMENTS

| 2008/0147820 A1* | 6/2008 | Maeda .................. H04L 9/0858 709/213 |
| 2015/0271147 A1 | 9/2015 | Tanizawa et al. |
| 2016/0285629 A1 | 9/2016 | Tanizawa |

FOREIGN PATENT DOCUMENTS

| JP | 4015385 | 11/2007 |
| JP | 2008-154019 A | 7/2008 |
| JP | 5424008 | 2/2014 |
| JP | 2015-179989 | 10/2015 |
| JP | 2016-181814 | 10/2016 |

\* cited by examiner

*Primary Examiner* — Izunna Okeke
(74) *Attorney, Agent, or Firm* — Oblon, McClelland, Maier & Neustadt, L.L.P.

(57) ABSTRACT

According to an embodiment, a communication device includes a receiver, an allocator, a first communication unit, an encryption processor, a second communication unit, and a controller. The receiver is configured to receive a shared key shared with another device. The allocator is configured to allocate the shared key to a transmission key or a reception key. The first communication unit is configured to receive data from an application. The encryption processor is configured to encrypt the data with the transmission key and decrypt the data encrypted by the other device with the reception key. The second communication unit is configured to communicate with the other device by using the encrypted data. The controller is configured to control at least one of allocation of the shared key, traffic of the first communication unit, and traffic of the second communication unit, by using state information of the device.

12 Claims, 10 Drawing Sheets

FIG.6 tun0　Link encap:UNSPEC　HWaddr 00-00-00-00-00-00-00-00-00-00-00-00-00-00-00-00
inet addr:192.168.100.2　P-t-P:192.168.100.2　Mask:255.255.255.255
UP POINTOPOINT RUNNING NOARP MULTICAST　MTU:1500　Metric:1
RX packets:0 errors:0 dropped:0 overruns:0 frame:0
TX packets:0 errors:0 dropped:0 overruns:0 carrier:0
collisions:0 txqueuelen:500
RX bytes:0 (0.0 B) TX bytes:0 (0.0 B)

COMMUNICATION DEVICE, COMMUNICATION SYSTEM, AND COMMUNICATION METHOD

CROSS-REFERENCE TO RELATED APPLICATIONS

This application is based upon and claims the benefit of priority from Japanese Patent Application No. 2016-160603, filed on Aug. 18, 2016; the entire contents of which are incorporated herein by reference.

FIELD

Embodiments described herein relate generally to a communication device, a communication system, and a communication method.

BACKGROUND

In the art, there has been known quantum key distribution (QKD) where a shared key for encrypted data communication is securely shared by using single photons continuously transmitted between a transmission node and a reception node which are connected through an optical fiber.

In a quantum key distribution system (quantum cryptographic communication system), a generation speed of the shared key depends on a distance between sites, a quality of the optical fiber, and the like. The generation speed is in a range of several kbps to several hundred kbps. The generation speed of the shared key changes according to an external environment and disturbance of the optical fiber, installation environments of the transmission node and the reception node, and the like. Furthermore, in a case where there is an attack suspected as wiretapping, there is a possibility that the generation speed of the shared key may be sharply decreased or the generation may be stopped.

In the quantum key distribution technique in the art, in a case where an encryption process is performed by using one time pad (OTP), advanced encryption standard (AES), or the like where exchange of shared keys is frequently performed, there is a risk that the key used for the encryption process may be depleted.

BRIEF DESCRIPTION OF THE DRAWINGS

FIG. 6 is a diagram illustrating an example of statistical information according to the embodiment;

DETAILED DESCRIPTION

According to an embodiment, a communication device communicates with another device, and includes a receiver, an allocator, one or more first communication units, an encryption processor, one or more second communication units, and a controller. The receiver is configured to receive a shared key shared with the other device. The allocator is configured to allocate the shared key to a transmission key or a reception key. The one or more first communication units are configured to receive data from an application. The encryption processor is configured to encrypt the data by using the transmission key and decrypt the data encrypted by the other device by using the reception key. The one or more second communication units are configured to communicate with the other device by using the encrypted data. The controller is configured to control at least one of allocation of the shared key, first traffic of the first communication unit, and second traffic of the second communication unit, by using state information indicating a state of the communication device.

Embodiments of communication devices, communication systems, and communication methods will be described in detail with reference to the attached drawings.

Device Configuration of Communication System

Figure 1:
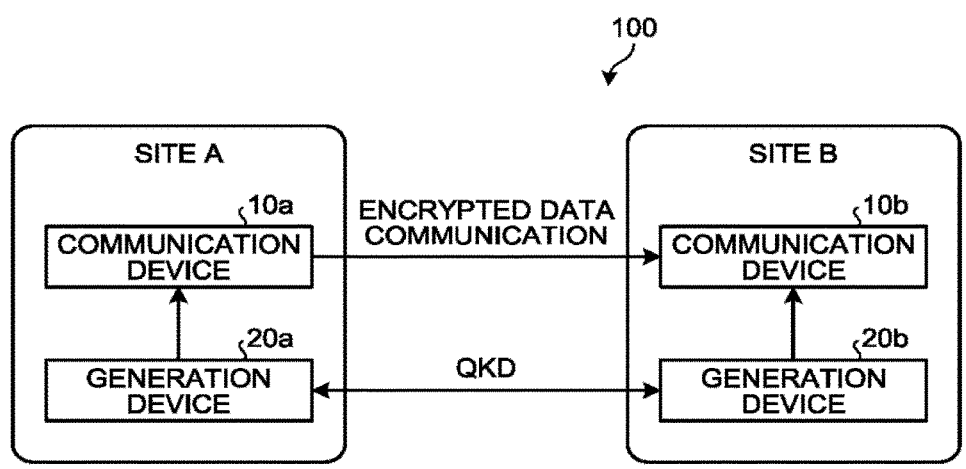
FIG. 1 is a diagram illustrating an example of a device configuration of a communication system according to an embodiment.

FIG. 1 is a diagram illustrating an example of a device configuration of a communication system 100 according to an embodiment. The communication system 100 according to the embodiment is configured to include a communication device 10a, a communication device 10b, a generation device 20a, and a generation device 20b. The communication device 10a and the generation device 20a are installed at a site A. The communication device 10b and the generation device 20b are installed at a site B. The communication system 100 according to the embodiment is a system that communicates between the site A and the site B on the basis of encrypted data.

In the description of the embodiment, a case where the communication device 10a encrypts data and the communication device 10b decrypts encrypted data will be described as an example. In addition, the communication device 10b may encrypt the data, and the communication device 10a may decrypt the encrypted data.

The communication device 10a encrypts the data by using a shared key generated by the generation device 20a and transmits the encrypted data to the communication device 10b. A communication method for the encrypted data may be a wired or wireless method, or a combination of wired and wireless methods may be used. The communication method for the encrypted data is, for example, Ethernet (registered trademark). The communication device 10b decrypts the encrypted data by using a shared key generated by the generation device 20b.

The generation device 20a and the generation device 20b generate shared keys shared with each other by quantum key distribution.

Hereinafter, in a case where the communication device 10a and the communication device 10b are not distinguished from each other, it is simply referred to as a communication device 10. Similarly, in a case where the generation device 20*a* and the generation device 20*b* are not distinguished from each other, it is simply referred to as generation device 20.

Quantum Key Distribution

Next, an example of a shared key generation method by using quantum key distribution will be described.

Figure 2:
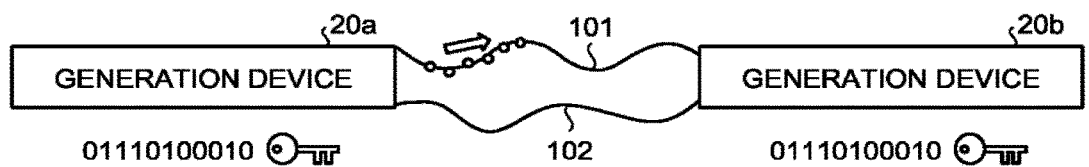
FIG. 2 is a diagram for describing an example of a shared key generation method according to an embodiment.

FIG. 2 is a diagram for explaining the example of the shared key generation method according to the embodiment. The generation device 20*a* and the generation device 20*b* according to the embodiment are connected by a quantum communication path 101 and a classical communication path 102.

The quantum communication path 101 transmits a sequence of photons configured with single photons indicating 0 or 1. The quantum communication path 101 is, for example, an optical fiber link.

The classical communication path 102 transmits data. The data transmitted through the classical communication path 102 is control data for a key distillation process (a shifting process, an error correction process, and a confidentiality enhancement process) executed by, for example, the generation devices 20*a* and 20*b*. The classical communication path 102 may be a wired or wireless path or may be realized by combining the wired and wireless paths. The classical communication path 102 is, for example, Ethernet (registered trademark).

The generation devices 20*a* and 20*b* generate the shared keys shared with each ether by quantum key distribution. The shared key is a random number represented by a sequence of digital data indicating 0 or 1. Specifically, the generation device 20*a* generates a single photon by pulses of the laser and transmits a sequence of photons configured with the single photons to the generation device 20*b* through the quantum communication path 101. The generation device 20*a* and the generation device 20*b* generate the shared keys from the sequence of photons by executing the key distillation process.

For example, a BB 84 protocol is used for transmission and reception of the sequence of photons on the quantum communication path 101. In a case where the BB 84 protocol is used, if a sequence of photons on the quantum communication path 101 is wiretapped, a quantum state (photon polarization direction) of the photon is changed according to the principle of quantum mechanics. This increases a quantum bit error rate (QBER) detected at the reception side. Therefore, in a case where the sequence of photons on the quantum communication path 101 is wiretapped, the generation device 20*a* and the generation device 20*b* can detect, from the abnormality of the quantum bit error rate, that the sequence of photons on the quantum communication path 101 is wiretapped. Accordingly, the generation devices 20*a* and 20*b* can safely generate the shared keys from the sequence of photons.

Functional Configuration of Communication Device

Next, an example of the functional configuration of the communication device 10 according to the embodiment will be described.

Figure 3:
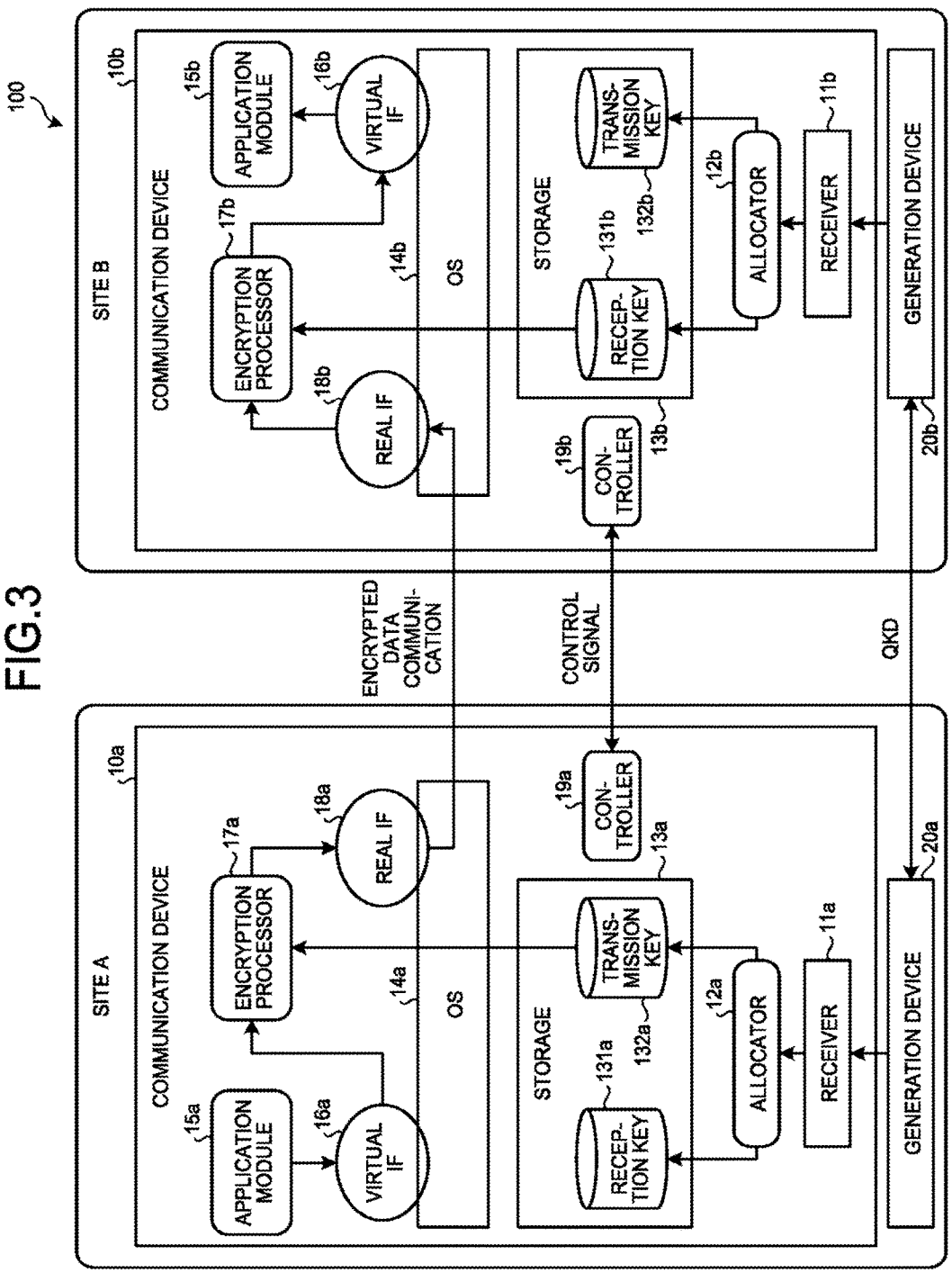
FIG. 3 as a diagram illustrating an example of a functional configuration of a communication device according to an embodiment.

FIG. 3 is a diagram illustrating an example of a functional configuration of the communication device 10 according to the embodiment. In the description of FIG. 3, a case where the communication device 10*a* transmits the encrypted data to the communication device 10*b* and the communication device 10*b* decrypts the encrypted data will be described as an example. In addition, the communication device 10*b* may transmit the encrypted data to the communication device 10*a*, and the communication device 10*a* may decrypt the encrypted data.

The communication device 10*a* according to the embodiment is configured to include a receiver 11*a*, an allocator 12*a*, a storage 13*a*, an OS 14*a*, an application module 15*a*, a virtual IF (interface) 16*a* (first communication unit), an encryption processor 17*a*, a real IF 18*a* (second communication unit), and a controller 19*a*. The application module 15*a*, the virtual IF 16*a*, the encryption processor 17*a*, and the real IF 18*a* are not limited to one, but there may be plural ones.

The storage 13*a* stores a reception key 131*a* and a transmission key 132*a*. The reception key 131*a* is used for decrypting the encrypted data. The transmission key 132*a* is used for encrypting data. The storage 13*a* may be provided outside the communication device 10*a* and not inside the communication device 10*a*.

If the receiver 11*a* receives the shared key from the generation device 20*a*, the receiver 11*a* inputs the shared key to the allocator 12*a*.

If the allocator 12*a* receives the shared key from the receiver 11*a*, the allocator 12*a* allocates the shared key to the reception key 131*a* or the transmission key 132*a*.

In a case where both the encrypted data transmission from the communication device 10*a* to the communication device 10*b* and the encrypted data transmission from the communication device 10*b* to the communication device 10*a* are performed (in the case of performing encrypted data communication with full duplex), the shared key allocated to the reception key 131*a* by the allocator 12*a* may be allocated to the transmission key 132*b* in the allocator 12*b* of the communication device 10*b*. On the contrary, the shared key allocated to the transmission key 132*a* by the allocator 12*a* is allocated to the reception key 131*b* in the allocator 12*b* of the communication device 10*b*.

In a case where there is a plurality of application modules 15*a*, the allocator 12*a* may further allocate the reception key 131*a* and the transmission key 132*a* to each application module 15*a*.

In addition, in a case where there are a plurality of the virtual IFs 16*a* and there are a plurality of the real IFs 18*a*, the allocator 12*a* may further allocate the reception key 131*a* and the transmission key 132*a* to each communication path in the communication device 10 determined by a combination of the virtual IFs 16*a* and the real IFs 18*a*.

In addition, the allocation process for the shared key by the allocator 12*a* may not be performed. For example, in a case where the cryptosystem is AES, the same shared key is used for the encryption process and the decryption process, so that the allocation process for the reception key 131*a* and the transmission key 132*a* is unnecessary. In a case where block ciphers such as AES are used, although security on information theory is not satisfied, substantial communication security can be maintained very high by sufficiently increasing an update frequency of the shared key.

In addition, for example, in a case where there is only one application module 15*a*, the allocation process for each application module 15*a* is unnecessary. Therefore, for example, in a case where there is one application module 15*a* and the cryptosystem is AES, the allocator 12*a* may not be necessary.

The OS 14*a* is basic software for controlling operations on the hardware of the communication device 10*a*. The OS 14*a* provides, for example, a network interface function by using the virtual IF 16*a*, a communication function by using the real IF 18*a*, and the like.

The application module 15a is an arbitrary application that operates on the communication device 10a.

The virtual IF 16a (first communication unit) is a virtual interface used by the application module 15a. The virtual IF 16a is not directly connected to the communication function (real IF 18a) provided by the OS 14a. Namely, in the virtual IF 16a, there is no hardware such as a communication card which the virtual IF directly corresponds to. Instead, the virtual IF 16a is associated with another functional block (the encryption processor 17a in the example of FIG. 3). If the virtual IF 16a receives data (plain text) from the application module 15a, the virtual IF 16a inputs the data to the encryption processor 17a.

The application module 15a uses an encryption process (in the case of transmitting encrypted data to the communication device 10b) by the encryption processor 17a and a decryption process (in the case of receiving the encrypted data from the communication device 10b) through the virtual IF 16a. At this time, since the application module 15a is only communicating through the virtual IF 16a, it is not concerned about whether or not the data are encrypted and what cryptosystem is performed. Therefore, even if the application module 15a is a general application not equipped with an encryption function, cryptographic communication can be performed. Namely, by using the functional configuration of the communication device 10a illustrated in FIG. 3, it possible to facilitate encryption corresponding and transplanting of an existing application.

In addition, there may be a plurality of the application modules 15a and a plurality of the virtual IFs 16a. In a case where there are a plurality of the application modules 15a and a plurality of the virtual IFs 16a, for example, each application module 15a may perform cryptographic communication through the dedicated virtual IF 16a. At this time, for example, a plurality of the encryption processors 17a may also be included, and the encryption processors 17a that perform the encryption process using different cryptosystems may be connected to respective combinations of the application modules 15a and the virtual IFs 16a.

The encryption processor 17a encrypts the data by using the transmission key 132a and inputs the encrypted data to the real IF 18a. The encrypted data are decrypted by the encryption processor 17b of the communication device 10b using the reception key 131b.

In the example of FIG. 3, the encryption processor 17a is illustrated so as to be a software function on the OS 14a. However, the encryption processor 17a may be realized in other methods. For example, the encryption processor 17a may be realized as a function of the OS 14a or may be realized as a function of a driver operating on the OS 14a. In addition, for example, the encryption processor 17a may be realized by dedicated hardware.

The cryptosystem used in the encryption processor 17a may be any cryptosystem that uses the shared key generated by the generation device 20a. The cryptosystem used in the encryption processor 17a is, for example, OTP, AES, or the like.

Since the shared key shared by the generation device 20a and the generation device 20b is assured not to be wiretapped, the security is very high. Therefore, by performing cryptographic communication by using the shared key, high security communication can be realized.

For example, in the case of performing encrypted data communication by using OTP, information theory assures that encrypted data cannot be deciphered by a wiretapper having any knowledge. The OTP is a method where encryption and decryption are performed by using a shared key having the same length as that of the data which are to be transmitted and received and a shared key once used is discarded without further use. A shared key used as a transmission key in one communication device is used as a decryption key in the other communication device.

The real IF 18a (second communication unit) is a communication function provided by the OS 14a. The real IF 18a directly corresponds to hardware such as a communication card. If the real IF 18a receives the encrypted data from the encryption processor 17a, the real IF 18a transmits the encrypted data to the communication device 10b.

The controller 19a controls at least one of the allocation of the shared key, the first traffic of the virtual IF 16a (first communication unit), and the second traffic of the real IF 18a (second communication unit) by using the state information indicating the state of the communication device 10a. In addition, the controller transmits and receives a control signal to/from the controller 19b of the communication device 10b. The control signal includes, for example, information for identifying the control performed by the controller 19a. Accordingly, for example, the controller 19b of the communication device 10b can perform control similar to the control performed by the controller 19a. The details of the operations of the controller 19a will be described later with reference to FIG. 4.

On the other hand, the communication device 10b according to the embodiment is configured to include a receiver 11b, an allocator 12b, a storage 13b, an OS 14b, an application module 15b, a virtual IF 16b (first communication unit), an encryption processor 17b, a real IF 18b, and a controller 19b. The configuration of the communication device 10b is the same as that of the communication device 10a.

Hereinafter, in a case where the communication devices 10a and 10b are not distinguished from each other, it is simply referred to as the communication device 10 (the receiver 11, the allocator 12, the storage 13, the OS 14, the application module 15, the virtual IF 16, the encryption processor 17, the real IF 18 and the controller 19).

In the description of the communication device 10b, the decryption process for the encrypted data transmitted from the communication device 10a will be described. The description of the receiver 11b, the allocator 12b, the storage 13b, and the OS 14b is the same as the description of the receiver 11a, the allocator 12a, the storage 13a, and the OS 14a, and thus, the description thereof will be omitted.

If the real IF 18b receives the encrypted data from the communication device 10a, the real IF 18b inputs the encrypted data to the encryption processor 17b.

If the encryption processor 17b receives the encrypted data from the real IF 18b, the encryption processor 17b decrypts the encrypted data by using the reception key 131b corresponding to the transmission key 132b used for encryption of the encrypted data. Then, the encryption processor 17b inputs the decrypted data (plaintext) to the virtual IF 16b.

If the virtual IF 16b receives the decrypted data from the encryption processor 17b, the virtual IF 16b inputs the decrypted data to the application module 15b.

If the application module 15b receives the decrypted data from the virtual IF 16b, the application module 15b performs a predetermined process by using the decrypted data.

Functional Configuration of Controller

Next, the operations of the controller 19 will be described in detail.

Figure 4:
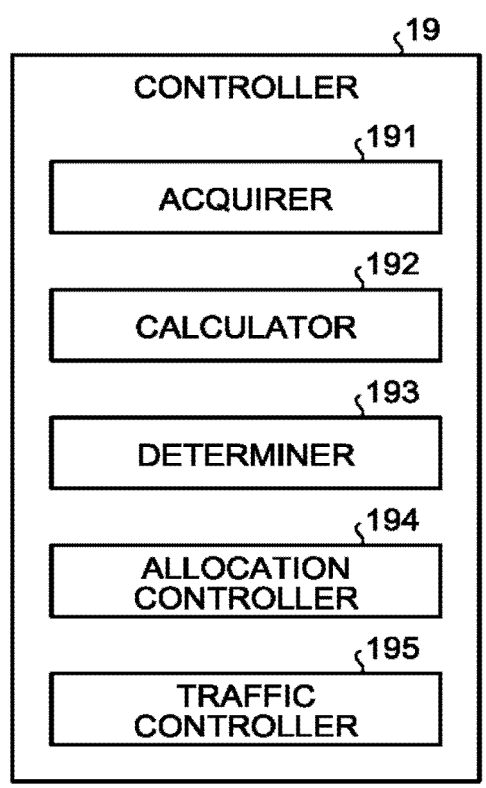
FIG. 4 is a diagram illustrating an example of a functional configuration of a controller according to the embodiment.

FIG. 4 is a diagram illustrating an example of a functional configuration of the controller 19 according to the embodiment. The controller 19 according to the embodiment is configured to include an acquirer 191, a calculator 192, a determiner 193, an allocation controller 194, and a traffic controller 195.

The acquirer 191 acquires state information indicating the state of the communication device 10 from at least one of the one or more functional blocks of the communication device 10 and the generation device 20.

Example of Status Information

Figure 5:
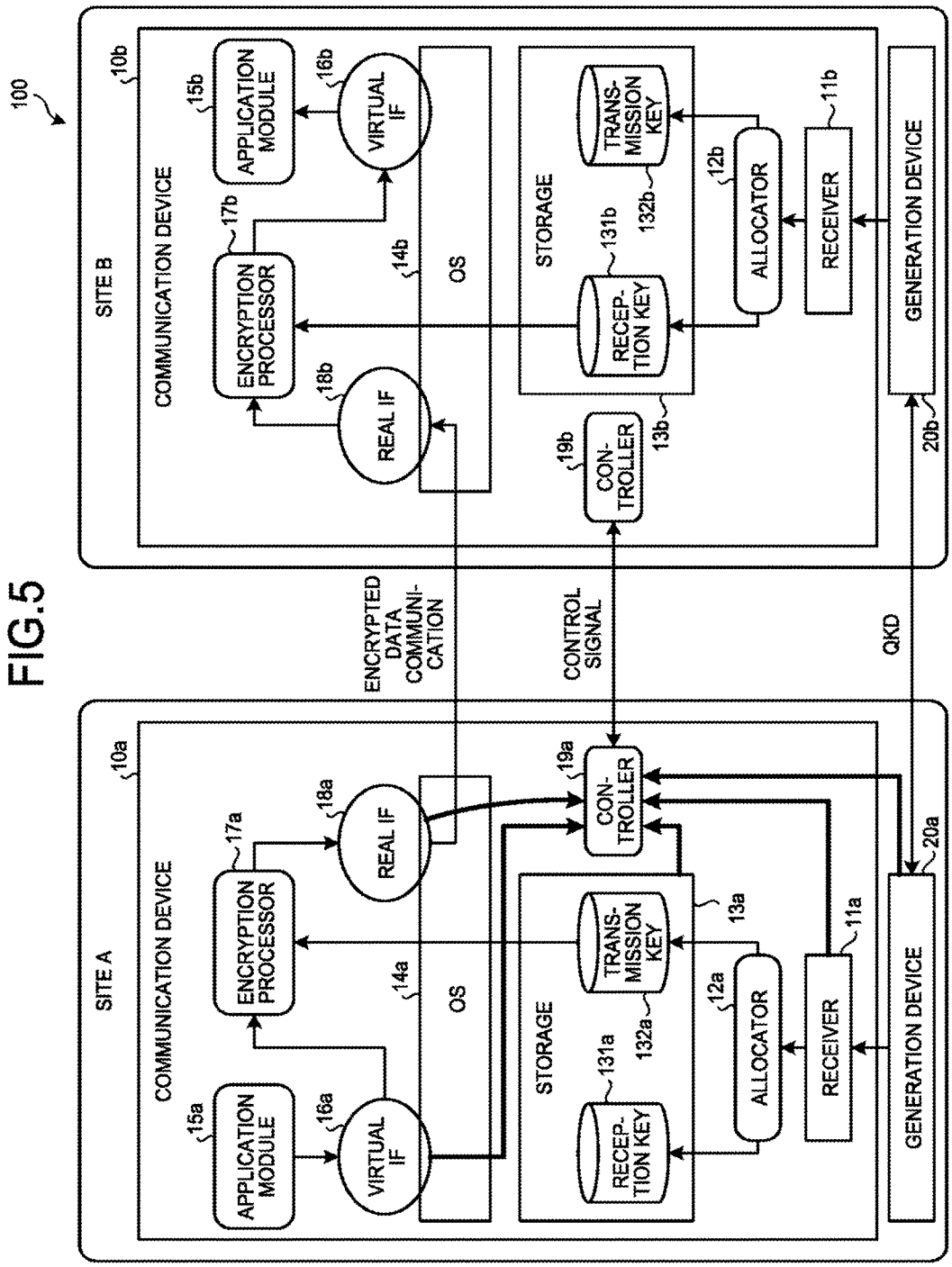
FIG. 5 is a diagram for describing an example of state information according to the embodiment.

FIG. 5 is a diagram for explaining an example of the state information according to the embodiment. The example in FIG. 5 illustrates a case where the communication device 10*a* acquires the state information from the receiver 11*a*, the storage 13*a*, the virtual IF 15*a*, and the real IF 18*a* and from the generation device 20*a*.

The state information acquired from the receiver 11*a* is, for example, a speed of reception of a shared key from the generation device 20*a* (generation speed of the shared key by the generation device 20*a*).

The state information acquired from the storage 13*a* is, for example, the amount of the reception key(s) 131*a* stored and the amount of the transmission key(s) 132*a* stored. In a case where there is a plurality of application modules 15*a* and the reception keys 131*a* and the transmission keys 132*a* are allocated to respective application modules 15*a*, the amount of the reception keys 131*a* stored and the amount of the transmission keys 132*a* stored are acquired in the respective application modules 15*a*.

The state information acquired from the virtual IF 16*a* is, for example, a communication speed of the virtual IF 16*a*, first statistical information of the virtual IF 16*a*, and a link state of the virtual IF 16*a*.

The first statistical information includes at least one of the number of packets input from the virtual IF 16*a* to the encryption processor 17*a*, an amount of data input from the virtual IF 16*a* to the encryption processor 17*a*, the number of packets received from the encryption processor 17*a* by the virtual IF 16*a*, an amount of data received from the encryption processor 17*a* by the virtual IF 16*a*, and a first error of the virtual IF 16*a*.

The link state of the virtual IF 16*a* indicates whether or not the virtual IF 16*a* is currently being used. The link states are, for example, a link-up state and a link-down state. The link-up state indicates that the virtual IF 16*a* is valid. The link-down state indicates that the virtual IF 16*a* is invalid. The link state of the virtual IF 16*a* may be acquired in a form included in the first statistical information.

The first error is, for example, an error code associated with a type of error. For example, the error of a case where data are input from the application module 15*a* to the encryption processor 17*a* through the virtual IF 16*a* but the transmission key 132*a* for encryption does not exist in the storage 13*a* (namely, a case where the transmission key is depleted), or the like can be specified and counted by a predetermined error code.

The state information acquired from the real IF 18*a* is, for example, a communication speed (link up speed) of the real IF 18*a*, second statistical information of the real IF 18*a*, and a link state of the real IF 18*a*.

The second statistical information includes at least one of the number of packets transmitted from the real IF 18*a* to the other device such as the communication device 10*b*, an amount of data transmitted from the real IF 18*a* to the other device such as the communication device 10*b*, the number of packets received from other devices such as the communication device 10*b* by the real IF 18*a*, an amount of data received from other devices such as the communication device 10*b* by the real IF 18*a*, and a second error of the real IF 18*a*.

The link state of the real IF 18*a* indicates whether or not the real IF 18*a* is currently being used. The link states are, for example, a link-up state and a link-down state. The link-up state indicates that the real IF 18*a* is valid. The link-down state indicates that the real IF 18*a* is invalid. The link state of the real IF 18*a* may be acquired in a form included in the second statistical information.

The second error is, for example, an error code associated with a type of error. For example, the error of a case where the encrypted data are input to the real IF 18*a* but the transmission process cannot follow up so that the encrypted data are discarded (namely, the case of packet dropping) or the like can be specified by a predetermined error code.

Hereinafter, in a case where the virtual IF 16 and the real IF 18 are not distinguished from each other, it is simply referred to as an interface. In a case where the first statistical information and the second statistical information are not distinguished from each other, it is simply referred to as statistical information.

FIG. 6 is a diagram illustrating an example of statistical information according to the embodiment. In the example of FIG. 6, the statistical information includes the number of transmitted packets (TX packets), an amount of transmission data (TX bytes), the number of received packets (RX packets), an amount of reception data (RX bytes), and the like.

The state information acquired from the generation device 20*a* is, for example, a generation speed (bps) of a shared key per unit time, a count rate (bps) of photons, and a quantum bit error rate (QBER). The count rate of photons and the quantum bit error rate (QBER) influence the generation speed of the shared key.

Example of Calculation Process

Returning to FIG. 4, the calculator 192 calculates information which is to be determined by the determiner 193 by using the state information which has been acquired by the acquirer 191.

The calculator 192 calculates a transmission key depletion time until the transmission key(s) 132 are depleted and a reception key depletion time until the reception key(s) 131 are depleted from a speed of reception of the shared key, the amount of the reception key(s) 131 stored, the amount of the transmission key(s) 132 stored, a first communication speed of the virtual IF 16, and a second communication speed of the real IF 18.

The calculator 192 calculates the transmission key depletion time by, for example, the amount of the transmission key(s) 132 stored/(communication speed–key generation speed). The key generation speed is, for example, a speed of reception of a shared key.

The communication speed is the slower speed between the first communication speed of the virtual IF 16 and the second communication speed of the real IF 18. For example, in a case where there is a plurality of the virtual IFs 16 and there is a plurality of the real IFs 18, the communication speed is determined for each combination of the virtual IFs 16 and the real IFs 18. In this case, the transmission key depletion time is calculated for each communication path in the communication device 10 determined by each combination of the virtual IFs 16 and the real IFs 18.

Similarly, the calculator 192 calculates the reception key depletion time by, for example, the amount of the reception key(s) 131 stored/(communication speed–key generation speed).

Example of Determination Process and Control Process

If the determiner 193 receives the state information from the acquirer 191, the determiner 193 determines whether or not there is a risk of depletion of the reception key 131 or the transmission key 132 (or whether or not the reception key or the transmission key has been depleted) by using the state information and the information calculated from the state information by the calculator 192. In a case where there is a risk of depletion, the allocation controller 194 controls allocation of the shared key by using the allocator 12, and the traffic controller 195 controls traffic of at least one of the virtual IF 16 and the real IF 18.

In a case where there is a risk of depletion of the reception key 131 or the transmission key 132, either the allocation control of the shared key by the allocator 12 or the traffic control of the traffic controller 195 may be performed, or both may be performed.

Figure 7:
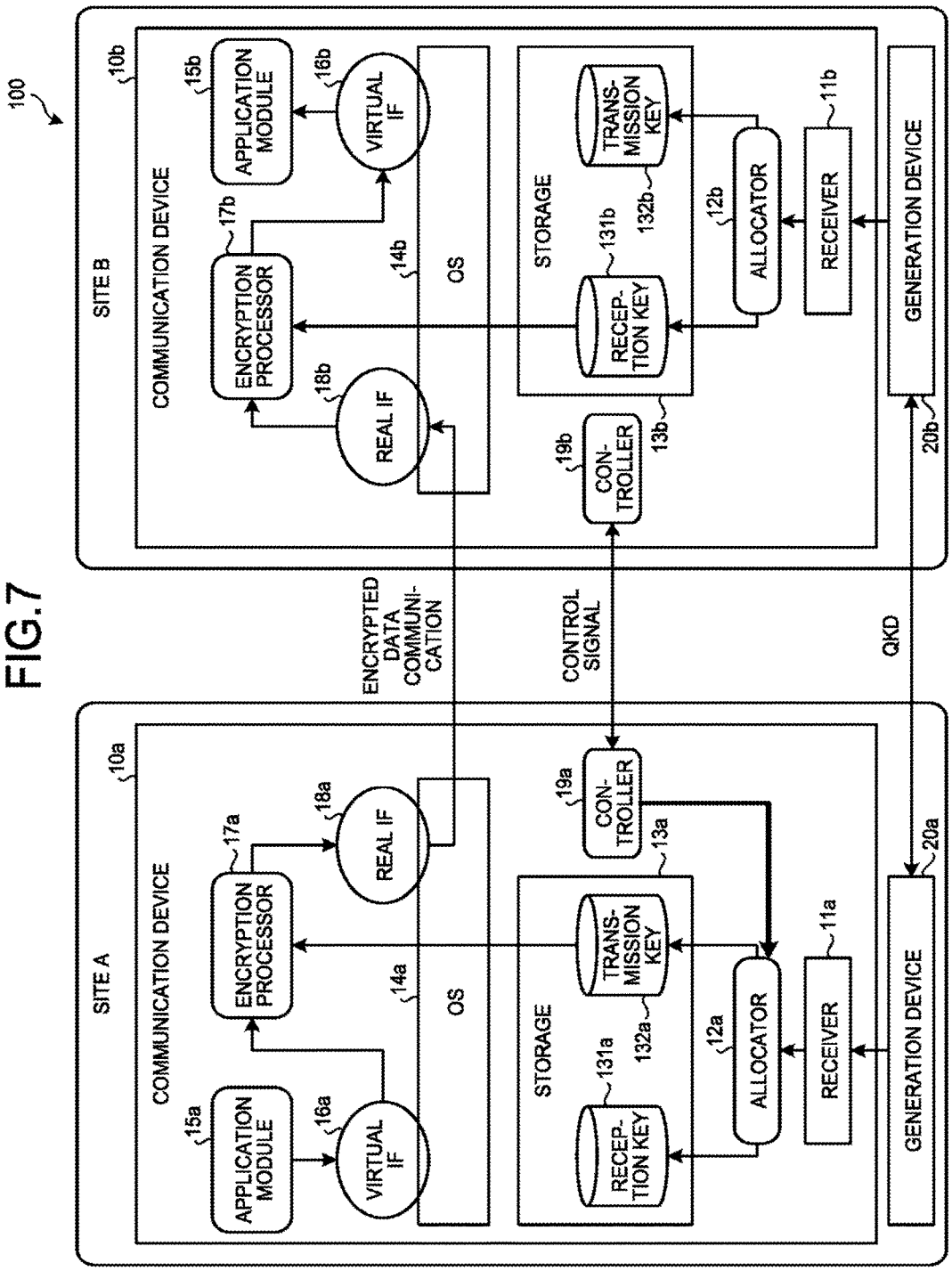
FIG. 7 is a diagram for describing an example of an allocation control method according to an embodiment.

FIG. 7 is a diagram for explaining an example of the allocation control method according to the embodiment. The example of FIG. 7 illustrates a case where the controller 19a (the allocation controller 194 of the communication device 10a) controls the allocation of the shared key by the allocator 12a.

Figure 8:
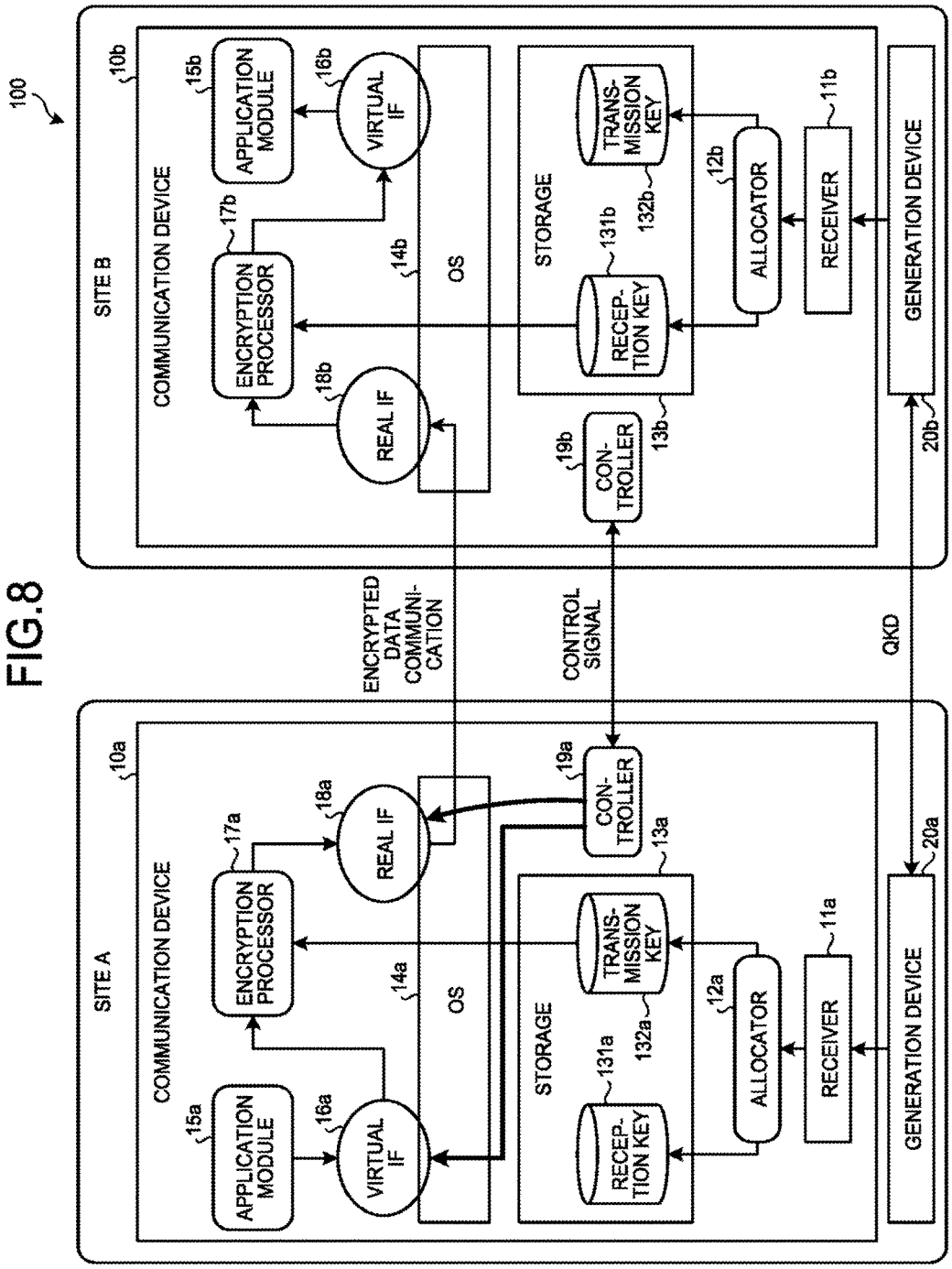
FIG. 8 is a diagram for describing an example of a traffic control method according to an embodiment.

FIG. 8 is a diagram for explaining an example of the traffic control method according to the embodiment. Traffic control imposes an upper limit on the communicable bandwidth and speed with respect to a certain interface. In the example of FIG. 8, the controller 19a (the traffic controller 195 of the communication device 10a) controls the first traffic of the virtual IF 16a and the second traffic of the real IF 18a. However, any one thereof may be controlled.

As a tool for performing the traffic control, for example, tc of linux (registered trademark) commands or the like can be used. The traffic controller 195 can control the traffic of the interface by executing the tc command on the interface to be controlled as traffic.

In the description of FIGS. 7 and 8, the operations of the controller 19a have been described on the site A side. However, the same control may be performed in both the site A and the site B under the control of the controller 19a on the site A side by notifying the site B side of the control signal indicating the control result. With respect to the allocation of the shared key, since the same allocation needs to be performed on the site A and the site B, the control results are synchronized. On the other hand, with respect to the traffic control, for example, one of the sites (for example, the communication device 10a side) may perform traffic control, and the other site may not perform the same traffic control as that of the one of the sites. For example, the controller 19b of the communication device 10b may perform the above-described traffic control independently from the controller 19a of the communication device 10a at the site A.

Returning to FIG. 4, the determiner 193 can estimate the future communication speed of the application module 15 and the ratio of the amount of the transmission data and the amount of the reception data from the values of the number of bytes and the number of packets of the transmission data at an interface, the values of the number of bytes and the number of packets of the reception data, and the ratio thereof. As a simple method, there is assuming that the current speed of the transmission data and reception data will be continuously maintained in the future, assuming that the current ratio of the amount of the transmission data and the amount of the reception data will be continuously maintained in the future, or assuming that the current ratio of the communication amount of each application will be continuously maintained in the future.

The determiner 193 can estimate a possibility of occurrence of key depletion in the corresponding interface in the future by referring to, for example, the number of errors generated in a certain interface, the number of bytes and the number of packets of transmission data or reception data, and time variation thereof. As a simple method, there is estimating that there is a possibility that key depletion may occur in a case where a change (communication speed) of the number of bytes and the number of packets of transmission data or reception data increases at the interface where key depletion occurred in the past.

In addition, the determination method by the determiner 193 and the control method by the allocation controller 194 and the traffic controller 195 may not be fixed. For example, different determination and control may be performed according to the time zone, the day of the week, the month, or the like.

Specific Example

Specifically, the determiner 193 determines, for example, the link state included in the statistical information. In the case of the link-down state, the allocation controller 194 inputs a stop request to the allocator 12 to stop allocating the reception key 131 and the transmission key to the application module 15 that is to use the interface.

In addition, for example, the determiner 193 determines whether or not the number of bytes (the number of packets) of the transmission data included in the statistical information is larger than the number of bytes (the number of packets) of the reception data included in the statistical information. In a case where the number of bytes (number of packets) of the transmission data included in the statistical information is larger than the number of bytes (the number of packets) of the reception data included in the statistical information, in the interface, in comparison with the reception key 131, there is a high possibility that the transmission key 132 is depleted.

Therefore, in a case where the number of bytes (the number of packets) of the transmission data included in the statistical information is larger than the number of bytes (the number of packets) of the reception data included in the statistical information, for example, the allocation controller 194 inputs, to the allocator 12, a priority request for prioritizing the allocation of the transmission key 132 to the application module 15 that is to use the interface. A degree of prioritization of allocation is determined according to the ratio of the number of transmission data (number of packets) and the number of bytes (number of packets) of reception data.

In a case where the number of bytes (the number of packets) of the transmission data included in the statistical information is larger than the number of bytes (the number of packets) of the reception data included in the statistical information, the traffic controller 195 may restrict the traffic of the transmission side of the interface. In addition, both of the shared key allocation control by the allocation controller 194 and the traffic control by the traffic controller 195 may be performed.

In addition, for example, the determiner 193 determines whether or not communication failure has occurred by determining whether or not the number of errors included in the statistical information is equal to or larger than a threshold value (third threshold value). The number of errors may be the number of one specific type of error (for example, packet drop or the like) or may be the number of different types of errors included in the statistical information (sum of occurrences of a plurality of different types of errors). In a case where the number of errors is equal to or larger than the threshold value, the allocation controller 194 inputs a stop request to the allocator 12 to stop allocating the shared key to the application module 15 which is to use the interface.

In addition, for example, the determiner 193 determines whether or not there is a risk that the reception key 131 or the transmission key 132 which is to be used by the application module 15 using the corresponding interface is depleted (or whether or not the reception key 131 or the transmission key 132 has been depleted) by referring to the number of depletion errors (reception key depletion errors and transmission key depletion errors) included in the statistical information. The allocation controller 194 allocates a shared key to the one of the reception key 131 and the transmission key 132 that has a higher risk of depletion. In addition, the traffic controller 195 restrict the traffic of the interface of the key that has a higher risk of depletion between the reception key 131 and the transmission key 132. In addition, both of the allocation control by the allocation controller 194 and the traffic control by the traffic controller 195 may be performed.

In addition, for example, the determiner 193 determines a change in the amount of the reception key(s) 131 (transmission key(s) 132) stored. In a case where the number of reception keys 1 (transmission key 132) is continuously increased, the allocation controller 194 restricts the allocation of the reception key 131 (transmission key 132) by the allocator 12. On the other hand, in a case where the number of reception keys 131 (transmission key 132) is continuously decreased, the allocation controller 194 prioritizes the allocation of the reception key 131 (transmission key 132) by the allocator 12.

In addition, for example, the determiner 193 determines a change in the generation speed of the shared key per unit time. In a case where the generation speed of the shared key per unit time is continuously increased, the allocation controller 194 increases a frequency of allocation process of the reception key 131 (transmission key 132) by the allocator 12. On the other hand, in a case where the generation speed of the shared key per unit time is continuously decreased, the allocation controller 194 reduces the frequency of allocation process of the reception key 131 (transmission key 132) by the allocator 12.

In addition, for example, the determiner 193 determines which of the above-described reception key depletion time and the above-described transmission key depletion time is shorter. In a case where the reception key depletion time is shorter than the transmission key depletion time, the allocation controller 194 inputs, to the allocator 12, a priority request for prioritizing the allocation of the reception key 131. On the other hand, in a case where the transmission key depletion time is shorter than the reception key depletion time, the allocation controller 194 inputs, to the allocator 12, a priority request for prioritizing the allocation of the transmission key 132.

In addition, for example, the determiner 193 determines whether or not the transmission key depletion time is equal to or smaller than a threshold value (first threshold value). In a case where the transmission key depletion time is equal to or smaller than the threshold value, the traffic controller 195 restricts at least one of the first traffic on the transmission side of the virtual IF 16 and the second traffic on the transmission side of the real IF 18 so that the transmission key depletion time becomes longer.

In addition, for example, the determiner 193 determines whether or not the reception key depletion time is equal to or smaller than a threshold value (second threshold value). In a case where the reception key depletion time is equal to or smaller than the threshold value, the traffic controller 195 restricts at least one of the first traffic on the reception side of the virtual IF 16 and the second traffic on the reception side of the real IF 18 so that the reception key depletion time becomes longer.

The restriction of the first traffic and the restriction of the second traffic may be performed for each application module 15. Namely, the traffic controller 195 restricts the first traffic and the second traffic by restricting the amount of data transmitted and received by the application module 15 for each application module 15.

In addition, the restriction of the first traffic and the restriction of the second traffic may be performed for each interface. Namely, in a case where there is a plurality of the virtual IFs 16, the traffic controller 195 restricts the first traffic for each virtual IF 16. Similarly, in a case where there is a plurality of the real IFs 18, the traffic controller 195 restricts the second traffic for each real IF 18.

In addition, for example, the determiner 193 determines whether or not there is an interface where the amount of transmission data and the amount of reception data are small and communication is hardly performed by referring to the statistical information. In a case where there is an interface where communication is hardly performed, the allocation controller 194 inputs, to the allocator 12, a stop request for stopping the allocation of the reception key 131 and the transmission key 132 to the application module 15 which is to use the corresponding interface.

In addition, for example, in a case where there are a plurality of the application modules 15 and there are a plurality of the virtual IFs 16, the determiner 193 inputs, to the allocator 12, a priority request for prioritizing the allocation of the reception key 131 and the transmission key 132 to the application module 15 (virtual IF 16) of which communication amount is equal to or larger than the threshold value by referring to the statistical information acquired from each virtual IF 16. On the other hand, the determiner 193 inputs, to the allocator 12, a stop request for not allocating the reception key 131 and the transmission key 132 to the application module 15 (virtual IF 16) of which communication amount is smaller than the threshold value.

In addition, as a result of the traffic control by the above-described traffic controller 195, there is a possibility that cryptographic communication is delayed and a portion of cryptographic communication data is lost. It is assumed that these are handled by combining retransmission control, error correction (FEC: Forward Error Correction) functions, and the like by a higher communication protocol or the like. For example, in the application module 15, the robustness of data communication is maintained by performing flow control and retransmission control based on TCP/IP, or the like.

In a case where the allocator 12 has received the above-described stop request from the controller 19, before the stop request is received, the reception key 131 (transmission key 132) which has been already allocated to the allocation stop target (the application module 15 or the like) may be maintained as it is.

Communication Method

Next, the communication method according to the embodiment will be described.

Shared Key Allocation Control

Figure 9:
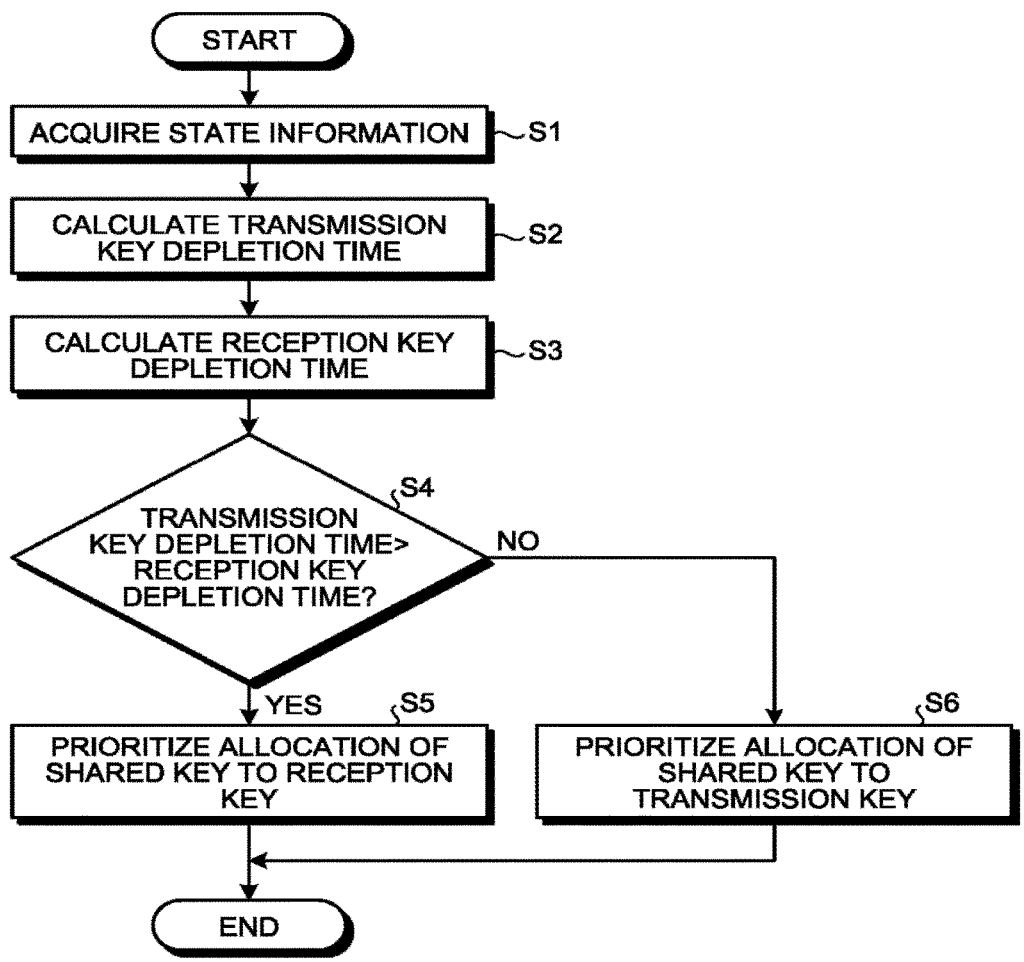
FIG. 9 is a flowchart illustrating an example of an allocation control method according to an embodiment.

FIG. 9 is a flowchart illustrating an example of the allocation control method according to the embodiment. In the example of FIG. 9, for simplifying the description, a case where there are one application module 15, one virtual IF 16, and one real IF 18 will be described. Namely, a case where there is one communication path in the communication device 10a and the reception key 131 and the transmission key 132 are not allocated to each application module 15 will be described.

First, the acquirer 191 acquires the above-described state information from one or more functional blocks of the communication device 10 and the generation device 20 (step S1).

Next, the calculator 192 calculates the above-described transmission key depletion time from the state information acquired in the process of step S1 (step S2).

Next, the calculator 192 calculates the above-described reception key depletion time from the state information acquired in the process of step S1 (step S3).

Next, the determiner 193 determines whether or not the transmission key depletion time is larger than the reception key depletion time (step S4). In a case where the transmission key depletion time is larger than the reception key depletion time (Yes in step S4), the allocation controller 194 prioritizes the allocation of the shared key tc the reception key 131 (step S5). In a case where the transmission key depletion time is not larger than the reception key depletion time (No in step S4), the allocation controller 194 prioritizes the allocation of the shared key to the transmission key 132 (step S6).

Traffic Control

Figure 10:
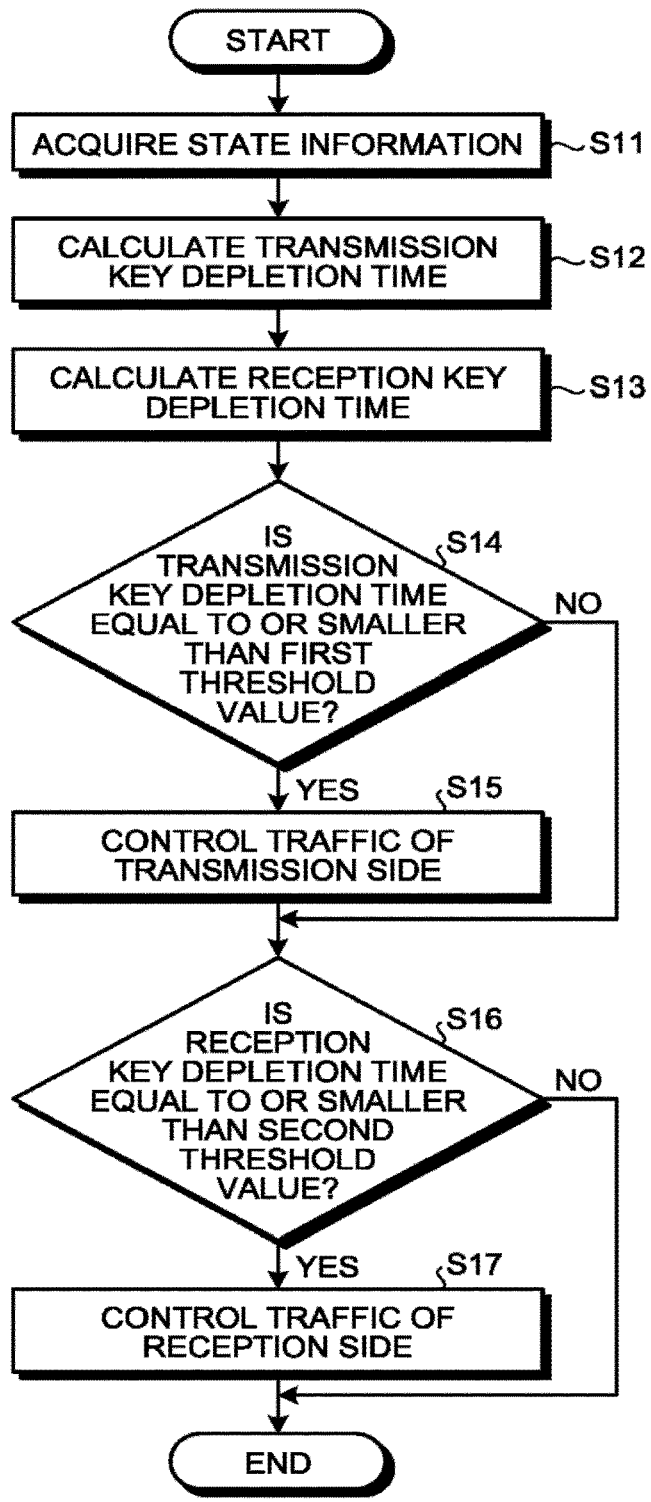
FIG. 10 is a flowchart illustrating an example of a traffic control method according to an embodiment.

FIG. 10 is a flowchart illustrating an example of the traffic control method according to the embodiment. In the example of FIG. 10, for simplifying the description, a case where there are one application module 15, one virtual IF 16, and one real IF 18 will be described. Namely, a case where there is one communication path in the communication device 10a and the reception key 131 and the transmission key 132 are not allocated to each application module 15 will be described.

The description of steps S11 to S13 is the same as the description of steps S1 to S3 in FIG. 9, and thus, the description thereof will be omitted.

Next, the determiner 193 determines whether or not the transmission key depletion time is equal to or smaller than the first threshold value (step S14).

In a case where the transmission key depletion time is equal to or smaller than the first threshold value (Yes in step S14), the traffic controller 195 restricts at least one of the first traffic on the transmission side of the virtual IF 16 and the second traffic on the transmission side of the real IF 18 so that the transmission key depletion time becomes longer (step S15). In a case where the transmission key depletion time is not equal to or smaller than the first threshold value (No in step S14), the process proceeds to step S16.

In a case where the reception key depletion time is equal to or smaller than the second threshold value (Yes in step S16), the traffic controller 195 restricts at least one of the first traffic on the reception side of the virtual IF 16 and the second traffic on the reception side of the real IF 18 so that the reception key depletion time becomes longer (step S17). In a case where the reception key depletion time is not equal to or smaller than the second threshold value (No in step S16), the process is ended.

Hardware Configuration of Communication System

Finally, an example of a hardware configuration of the communication system 100 according to the embodiment will be described.

Hardware Configuration of Communication Device

Figure 11:
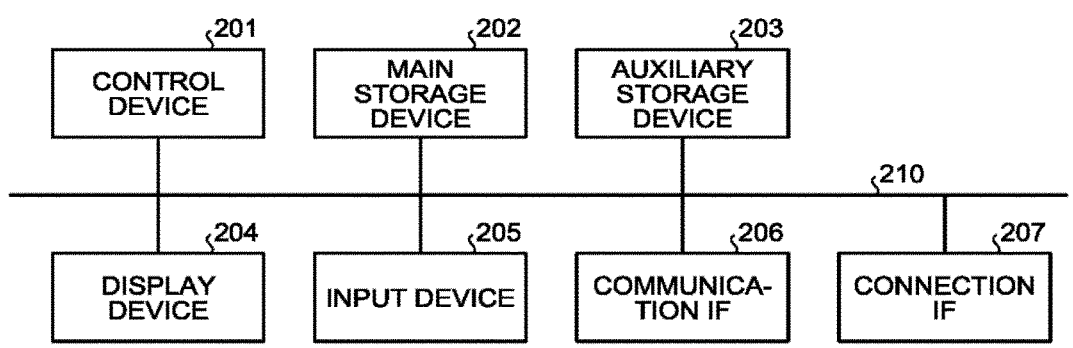
FIG. 11 is a diagram illustrating an example of a hardware configuration of a communication device according to an embodiment.

FIG. 11 is a diagram illustrating an example of a hardware configuration of the communication device 10 according to the embodiment. The communication device 10 according to the embodiment is configured to include a control device 201, a main storage device 202, an auxiliary storage device 203, a display device 204, an input device 205, a communication IF 206, and a connection IF 207. The control device 201, the main storage device 202, the auxiliary storage device 203, the display device 204, the input device 205, the communication IF 206, and the connection IF 207 are connected via a bus 210.

The control device 201 executes a program read from the auxiliary storage device 203 to the main storage device 202. The main storage device 202 is a memory such as a ROM (Read Only Memory) and a RAM (Random Access Memory). The auxiliary storage device 203 is a memory card, an HDD (Hard Disk Drive), or the like.

The display device 204 displays information. The display device 204 is, for example, a liquid crystal display. The input device 205 receives an input of information. The input device 205 is, for example, a keyboard, a mouse, or the like. In addition, the display device 204 and the input device 205 may be a liquid crystal touch panel or the like that also serves as a display function and an input function.

The communication IF 206 performs encrypted data communication with another communication device 10. The connection IF 207 is connected to the generation device 20. For example, the connection IF 207 receives the shared key from the generation device 20.

The program executed by the communication device 10 according to the embodiment is stored in a computer-readable storage medium such as a CD-ROM, a memory card, a CD-R, and a digital versatile disk (DVD) in a file in an installable format or an executable format to be provided as a computer program product.

In addition, the program executed by the communication device 10 according to the embodiment may be configured to be stored on a computer connected to a network such as the Internet so as to be provided by being downloaded via the network. In addition, the program executed by the communication device 10 according to the embodiment may be configured to be provided via the network such as the Internet without downloading.

In addition, the program executed by the communication device 10 according to the embodiment may be configured to be provided by being incorporated into a ROM or the like in advance.

The program executed by the communication device 10 according to the embodiment has a module configuration including functions realizable by a program among the functional configurations of the communication device 10 according to the above embodiment.

The functions realized by the program are loaded into the main storage device 202 by the control device 201 reading and executing the program from the storage medium such as the auxiliary storage device 203. Namely, the functions realized by the program are generated on the main storage device 202.

Some or all of the functions of the communication device 10 according to the embodiment may be realized by hardware such as an integrated circuit (IC).

Hardware Configuration of Generation Device

Figure 12:
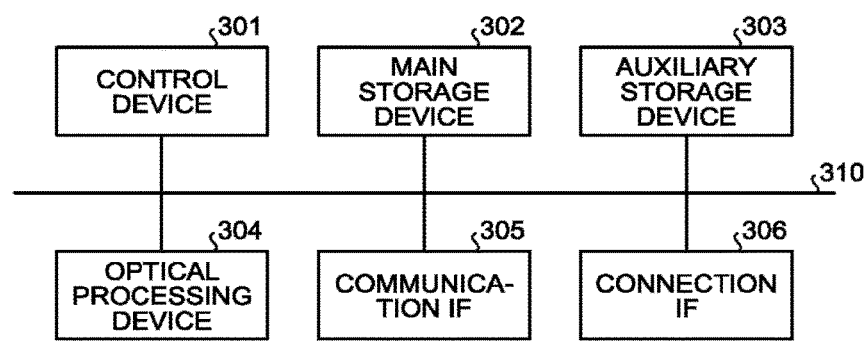
FIG. 12 is a diagram illustrating an example of a hardware configuration of a communication device according to an embodiment.

FIG. 12 is a diagram illustrating an example of a hardware configuration of the generation device 20 according to the embodiment. The generation device 20 according to the embodiment is configured to include a control device 301, a main storage device 302, an auxiliary storage device 303, an optical processing device 304, a communication IF 305, and a connection IF 306. The control device 301, the main storage device 302, the auxiliary storage device 303, the optical processing device 304, the communication IF 305, and the connection IF 306 are connected via a bus 310.

The description of the control device 301, the main storage device 302, and the auxiliary storage device 303 is the same as the description of the control device 201, the main storage device 202 and the auxiliary storage device 203, and thus, the description thereof will be omitted (refer to FIG. 11).

The optical processing device 304 transmits or receives the above-described single photons through the above-described quantum communication path 101. The communication IF 305 communicates with another generation device 20 through the above-described classical communication path 102. The connection IF 306 is connected to the communication device 10. The connection IF 306, for example, transmits the shared key to the communication device 10.

The program executed by the generation device 20 according to the embodiment is stored in a computer-readable storage medium such as a CD-ROM, a memory card, a CD-R, and a DVD in a file in an installable format or an executable format to be provided as a computer program product.

In addition, the program executed by the generation device 20 according to the embodiment may be configured to be stored on a computer connected to a network such as the Internet so as to be provided by being downloaded via the network. In addition, the program executed by the generation device 20 according to the embodiment may be configured to be provided via the network such as the Internet without downloading.

In addition, the program executed by the generation device 20 according to the embodiment may be configured to be provided by being incorporated into a ROM or the like in advance.

The program executed by the generation device 20 according to the embodiment has a module configuration including functions realizable by a program among the functional configurations of the generation device 20 according to the above embodiment.

The functions realized by the program are loaded into the main storage device 302 by the control device 301 reading and executing the program from the storage medium such as the auxiliary storage device 303. Namely, the functions realized by the program are generated on the main storage device 302.

Some or all of the functions of the generation device 20 according to the embodiment may be realized by hardware such as an IC.

As described above, in the communication device 10 according to the embodiment, the receiver 11 receives the shared key shared with other devices. The allocator 12 allocates the shared key to the transmission key 132 or the reception key 131. One or more virtual IFs 16 (first communication units) receive data from one or more application modules 15. The encryption processor 17 encrypts the data by using the transmission key 132 and decrypts the data encrypted by the other device by using the reception key 131. One or more real IFs 18 (second communication units) communicate with other devices according to the encrypted data. The controller 19 controls at least one of the allocation of the shared key, the first traffic of the virtual IF 16, and the second traffic of the real IF 18 by using the state information indicating the state of the communication device 10.

Accordingly, according to the communication device 10 according to the embodiment, it is possible to prevent the keys (the reception key 131 and the transmission key 132) used for the encryption process from being depleted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device for communicating with another device, comprising:
   one or more hardware processors configured to function as:
   a receiver configured to receive a shared key shared with the other device;
   an allocator configured to allocate the shared key to a transmission key or a reception key;
   one or more first communication units configured to receive data from an application;
   an encryption processor configured to encrypt the data by using the transmission key and decrypt the data encrypted by the other device by using the reception key;
   one or more second communication units configured to communicate with the other device by using the encrypted data; and
   a controller configured to control at least one of allocation of the shared key, first traffic of each of the first communication units, and second traffic of each of the second communication units, by using state information indicating a state of the communication device, wherein
   the state information includes a speed of reception of the shared key, an amount of one or more transmission keys stored, an amount of one or more reception keys stored, a first communication speed of the first communication unit, and a second communication speed of the second communication unit, and
   the controller calculates a transmission key depletion time until the one or more transmission keys are depleted and a reception key depletion time until the one or more reception keys are depleted from the state information, the controller inputs, to the allocator, a priority request for prioritizing the allocation of the reception key in a case where the reception key depletion time is shorter than the transmission key depletion time, and the controller inputs, to the allocator, a priority request for prioritizing the allocation of the transmission key in a case where the transmission key depletion time is shorter than the reception key depletion time.

2. The device according to claim 1, wherein the state information includes at least one of a speed of reception of the shared key, an amount of one or more transmission keys stored, an amount of one or more reception keys stored, a first communication speed of the first communication unit, a second communication speed of the second communication unit, first statistical information of the first communication unit, and second statistical information of the second communication unit.

3. The device according to claim 2, wherein the first statistical information includes at least one of the number of packets input from the first communication unit to the encryption processor, an amount of data input from the first communication unit to the encryption processor, the number of packets received from the encryption processor by the first communication unit, an amount of data received from the encryption processor by the first communication unit, and a first error of the first communication unit.

4. The device according to claim 2, wherein the second statistical information includes at least one of the number of packets transmitted from the second communication unit to the other device, an amount of data transmitted from the second communication unit to the other device, the number of packets received from the other device by the second communication unit, an amount of data received from the other device by the second communication unit, and a second error of the second communication unit.

5. The device according to claim 1, wherein
the controller restricts at least one of the first traffic on the transmission side and the second traffic on the transmission side so that the transmission key depletion time becomes longer in a case where the transmission key depletion time is equal to or smaller than a first threshold value, and the controller restricts at least one of the first traffic on the reception side and the second traffic on the reception side so that the reception key depletion time becomes longer in a case where the reception key depletion time is equal to or smaller than a second threshold value.

6. The device according to claim 5, wherein
the allocator allocates the transmission key and the reception key to each application, and
the controller restricts at least one of the first traffic and the second traffic for each application.

7. The device according to claim 5, comprising a plurality of the first communication units and a plurality of the second communication units, wherein
the controller restricts the first traffic for each of the first communication units in the case of restricting the first traffic and restricts the second traffic for each of the second communication units in the case of restricting the second traffic.

8. The device according to claim 1, wherein
the allocator allocates the transmission key and the reception key to each application,
the state information includes a first error of the first communication unit and a second error of the second communication unit, and
the controller inputs, to the allocator, a stop request for stopping allocating the shared key to the application using a communication path where at least one of the number of first errors and the number of second errors is equal to or larger than a third threshold value.

9. The device according to claim 1, wherein
the allocator allocates the transmission key and the reception key to each application, and
the controller inputs, to the allocator, a stop request for stopping allocating the shared key to the application using the communication path where at least one of the first communication unit and the second communication unit is linked down.

10. The device according to claim 1, wherein
the communication device is connected to a generation device generating the shared key by using quantum key distribution, and
the receiver receives the shared key from the generation device.

11. A communication system comprising a plurality of communication devices, each communication device comprising:
one or more hardware processors configured to function as:
a receiver configured to receive a shared key shared with another device;
an allocator configured to allocate the shared key to a transmission key or a reception key;
one or more first communication units configured to receive data from an application;
an encryption processor configured to encrypt the data by using the transmission key and decrypt the data encrypted by the other device by using the reception key;
one or more second communication units configured to communicate with the other device by using the encrypted data; and
a controller configured to control at least one of allocation of the shared key, first traffic of each of the first communication units, and second traffic of each of the second communication units by using state information indicating a state of the communication device, wherein
the state information includes a speed of reception of the shared key, an amount of one or more transmission keys stored, an amount of one or more reception keys stored, a first communication speed of the first communication unit, and a second communication speed of the second communication unit, and
the controller calculates a transmission key depletion time until the one or more transmission keys are depleted and a reception key depletion time until the one or more reception keys are depleted from the state information, the controller inputs, to the allocator, a priority request for prioritizing the allocation of the reception key in a case where the reception key depletion time is shorter than the transmission key depletion time, and the controller inputs, to the allocator, a priority request for prioritizing the allocation of the transmission key in a case where the transmission key depletion time is shorter than the reception key depletion time.

12. A communication method of a communication device communicating with another device, comprising:
receiving, by a receiver, a shared key shared with the another device;
allocating, by an allocator, the shared key to a transmission key or a reception key;
receiving, by one or more first communication units, data from an application;
encrypting, by an encryption processor, the data by using the transmission key;
decrypting, by the encryption processor, the data encrypted by the other device by using the reception key;
communicating, by one or more second communication units, with the other device by using the encrypted data; and
controlling, by a controller, at least one of allocation of the shared key, first traffic of each of the first communication units, and second traffic of each of the second communication units by using state information indicating a state of the communication device, wherein the state information includes a speed of reception of the shared key, an amount of one or more transmission keys stored, an amount of one or more reception keys stored, a first communication speed of the first communication unit, and a second communication speed of the second communication unit, and the controlling calculates a transmission key depletion time until the one or more transmission keys are depleted and a reception key depletion time until the one or more reception keys are depleted from the state information, the controlling inputs, to the allocator, a priority request for prioritizing the allocation of the reception key in a case where the reception key depletion time is shorter than the transmission key depletion time, and the controlling inputs, to the allocator, a priority request for prioritizing the allocation of the transmission key in a case where the transmission key depletion time is shorter than the reception key depletion time.

\* \* \* \* \*